United States Patent
Bair et al.

(10) Patent No.: US 6,170,872 B1
(45) Date of Patent: *Jan. 9, 2001

(54) DEFORMATION ELEMENT FOR A MOTOR VEHICLE DASHBOARD AND THE LIKE

(75) Inventors: Juergen Bair, Sindelfingen; Georg Bauer, Heilbronn; Alban Bossenmaier, Gaeufelden; Bernhard Holzapfel, Remshalden; Friedrich Reiter, Sindelfingen, all of (DE)

(73) Assignee: DaimlerChrysler AG, Stuttgart (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/048,123

(22) Filed: Mar. 26, 1998

(30) Foreign Application Priority Data

Mar. 26, 1997 (DE) .................... 197 12 662

(51) Int. Cl.⁷ ........................ B60R 21/04
(52) U.S. Cl. ............. 280/751; 280/752; 280/748
(58) Field of Search .................. 280/751, 752, 280/748; 297/488

(56) References Cited

U.S. PATENT DOCUMENTS

| 3,224,924 | * | 12/1965 | Ardenne et al. | 280/751 |
| 3,834,482 | * | 9/1974 | Wada et al. | 280/752 |
| 3,964,578 | * | 6/1976 | Campbell et al. | 280/752 |
| 4,518,172 | * | 5/1985 | Bortz et al. | 280/751 |
| 4,660,852 | * | 4/1987 | Katayama et al. | 280/751 |
| 4,978,136 | * | 12/1990 | Tomita et al. | 280/751 |
| 5,201,544 | * | 4/1993 | Matano et al. | 280/752 |
| 5,370,417 | * | 12/1994 | Kelman et al. | 280/751 |

FOREIGN PATENT DOCUMENTS

| 2 104 388 | 8/1972 | (DE) . |
| 40 03 952 A1 | 8/1991 | (DE) . |
| 0 676 315 A1 | 10/1995 | (EP) . |
| 405238338 | * 9/1993 | (JP) ............... 280/751 |

OTHER PUBLICATIONS

Automotive Engineering, Jan. 1997, 3 pages.

* cited by examiner

Primary Examiner—J. J. Swann
Assistant Examiner—James S. McClellan
(74) Attorney, Agent, or Firm—Evenson, McKeown, Edwards & Lenahan, P.L.L.C.

(57) ABSTRACT

A deformation element in a motor vehicle, especially for a dashboard, comprises at least one deformation body with a honeycomb cross section and encloses a cavity which is open on both sides. The wall of the cross section is closed all the way around, and is deformable to absorb energy and is subjected to an impact in the vicinity of one honeycomb side of the cross section for that purpose. The wall of the deformation body is formed from at least two partial sections connected with one another.

12 Claims, 2 Drawing Sheets

DEFORMATION ELEMENT FOR A MOTOR VEHICLE DASHBOARD AND THE LIKE

This application claims the priority of German application 197 12 662.6, filed Mar. 26, 1997, the disclosure of which is expressly incorporated by reference herein.

The present invention relates to a deformation element in a motor vehicle, especially for a dashboard, with at least one deformation body with a honeycomb cross section enclosing a cavity open on both sides, with the wall of said cross section being closed all the way around and being formed of two partial sections connected together and being deformable to absorb energy, and being subjected to impact in the vicinity of one honeycomb side of the cross section, with the partial sections overlapping in opposite connecting areas and thus forming a double layer.

A deformation element in a vehicle is described in DE-OS 2,104,388. This element has a honeycomb deformation body made of two partial sections overlapping in opposite connecting areas, thus forming a double layer. This reinforcing overlap is created in the lateral areas in which the deformation body is supposed to fold up, for which reason grooves are made in the material to facilitate bending, to overcome the reinforcing effect and allow deformation.

A deformation element for a knee impact protector is shown in the journal "AUTOMOTIVE ENGINEERING," January 1997, page 139. The element there is formed of a plurality of hexagonal honeycomb aluminum elements abutting one another. The one-piece and cast form of the deformation element makes manufacturing expensive. The aluminum elements cannot be varied significantly in terms of their wall thickness, nor is it possible to produce a change that is easy to perform for a different application. Only an expensive material can be used for the special shape and deformability.

A hexagonal honeycomb deformation element that is solid and made in one piece is likewise shown in DE 40 03 952 Al. Moreover, EP 0 676 315 Al describes an impact structure in a motor vehicle in which two shaped panels enclose a cavity with a hexagonal cross section and are joined together at the sides. This double-layered structure has no effect on the deformability of the deformation body formed at the sides.

An object of the present invention is to provide a deformation element which is readily manufactured and can be economically adapted to a variety of applications.

This object has been achieved by using a connecting area to form the honeycomb side subjected to impact.

A deformation element with a deformation body of this type is composed of a honeycomb wall around a hollow chamber which is open on both sides and which is subjected to impact in the vicinity of one honeycomb side of the cross section. This arrangement makes possible energy absorption of the hexagonal honeycomb wall favorable to an occupant striking it by deformation.

This wall can convert the force of the received impact into deformation in both of the lateral abutting legs of one side of the honeycomb, which is mounted as vertically as possible with respect to the direction of stress, with the force remaining approximately constant over the deformation distance in a dynamic impact.

The honeycomb deformation body in its fully deformed state has a small overall length so that the installation space can be used approximately as the deformation distance. The direction in which the force is applied does not play an important role in the possible deformation of the deformation body. Rounded corners and sides of the deformation body which are indented toward the center contribute to this wall not bending but being continuously deformed.

Manufacture of the hexagonal honeycomb deformation from at least two partial sections joined to one another is very much simpler and more economical than making this expensive shape in one piece. Thus every partial section can be made from steel, for example by stamping or bending. The partial sections can be connected using conventional welding processes or point-fastening means.

The fact that the deformation body is made of several parts also offers the considerable advantage that its design can be varied in a simple manner, and thus can be adapted to conditions in a specific vehicle inexpensively. The shapes of the partial sections can differ from one another or their material thicknesses can differ, so that a different deformation behavior is achieved.

The overlapping parts of the partial sections, at the areas where they abut one another, can be used to control deformation behavior because of the double layer produced in these areas, and can also form the honeycomb side subjected to impact.

In addition, the cross-sectional depth of a honeycomb half close to the impact can be configured to be less than that of the honeycomb half more remote from the impact, so that the honeycomb half close to the impact, is bent and fits completely in the honeycomb half remote from the impact. Thereby, a long displacement path for the dashboard and/or the knee impact protector is. made available because the residual overall or block length is small.

During this stamping or bending process, a retaining rib can be cut out of a wall of the deformation body and bent in one workstep, e.g. for fastening the dashboard.

In order to further increase the energy absorption for extreme loads, the deformation body can be supported on the vehicle by at least one lever-type mount which is likewise made deliberately capable of being deformed. The mount offers a higher resistance to deformation than the deformation body. The mount can be connected with the deformation body, offset from the middle of the wall, so that the introduction of force into the mount results in its bending.

Another way to achieve an increase in the deformation resistance of the deformation element is to mount a plurality of deformation bodies in a row in the impact direction and fasten them to one another. The circumference of the deformation the body or bodies located in a row in the impact direction is reduced so that the deformation resistance can be steadily increased. Increasing the width of the honeycomb deformation body also results in a higher deformation resistance.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
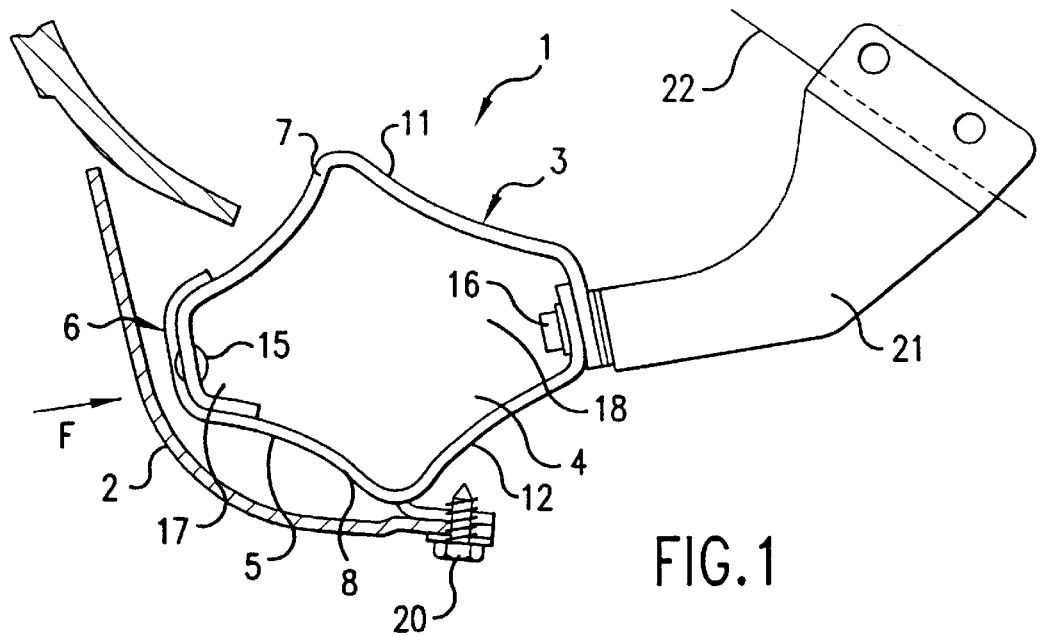
FIG. 1 is a side, partial cross-sectional view of a deformation element behind a knee impact protector in a vehicle interior.
Figure 2:
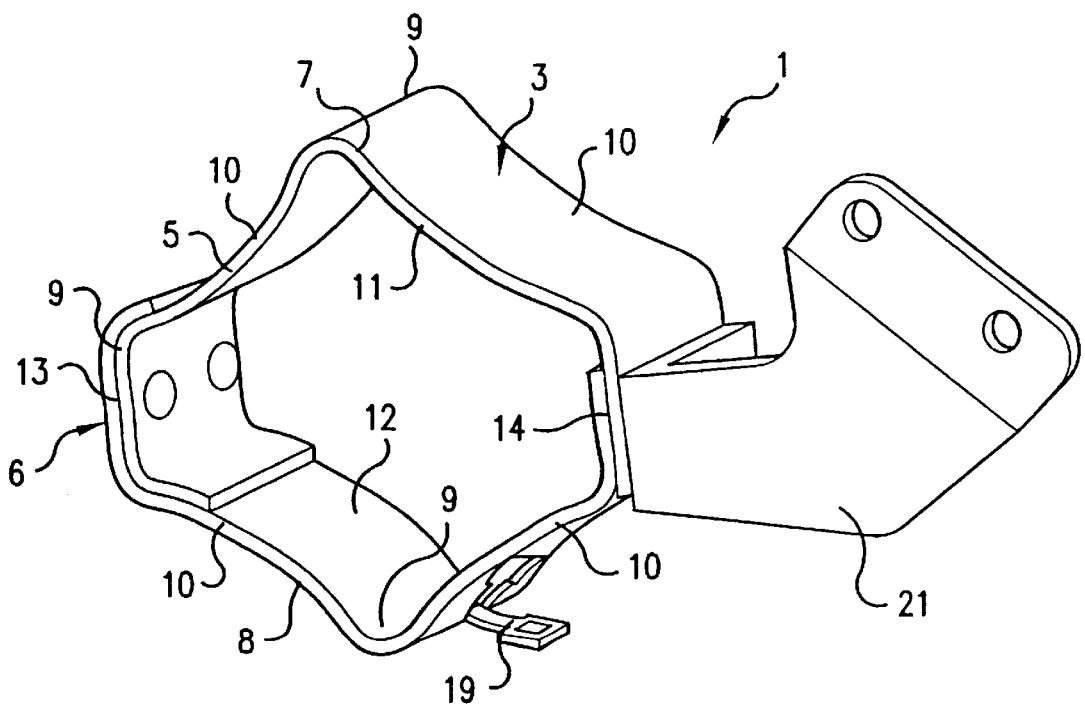
FIG. 2 is a perspective view of the deformation element shown in FIG. 1.

FIGS. 1 and 2 show a deformation element 1 for mounting in a motor vehicle, which element serves to damp the impact of an occupant against an associated portion of the dashboard, such as a knee impact protector 2, by a backward movement. Knee impact protector 2 is located in the shape of a panel in the interior of the vehicle at the level of the knees of an occupant and, upon the impact of said occupant against deformation element 1, is compressed, causing it to be deformed, thus converting impact energy into deformation energy.

Deformation element 1 comprises at least one deformation body 3 with a hexagonal honeycomb cross section and encloses by a wall 5 a cavity 4 which is open on both sides. The wall 5 is closed all the way around, is capable of being deformed to absorb energy, and is subjected to impact for this purpose in the vicinity of one honeycomb side 6 of the cross section.

The wall 5 converts the impact energy it receives into deformation in the two legs 7, 8 which laterally abut honeycomb side 6, with the force remaining approximately constant over the deformation travel under dynamic impact.

The honeycomb deformation body 3, in the fully deformed state, has a remaining block or overall length which is very small, so that the required space for installing the deformation body 3 can be utilized approximately as the deformation path. Rounded corners 9 and sides 10 of the deformation body 3 which are indented toward the center contribute to this wall 5 not bending but being deformed continuously.

The wall 5 of deformation body 3 is formed from at least two partial sections 11, 12 joined to one another. The manufacture of honeycomb deformation body 3 is therefore very much more simple and economical than the one-piece type. Thus, every partial section 11, 12 can be made of steel, for example by stamping or bending. The connection of partial sections 11, 12 in the respective overlapping connecting areas 13, 14 is performed by riveting 15 or by screwing 16. The double-layer connecting areas 13, 14 which result, because of their increased resistance to deformation, contribute to controlling the deformation behavior of deformation body 3 and can be used specifically for this purpose by varying the degree of overlap. Connecting area 13 is located in the principal impact direction (arrow F) of the force acting on the knee impact protector.

The multiple-part nature of deformation body 3 also offers the considerable advantage that its design can be varied in simple fashion and thus can be easily adapted to specific conditions in a vehicle. Thus the shapes of partial sections 11, 12 can differ from one another or their material thicknesses can be different, resulting in a different deformation behavior than with a symmetrical body.

Figure 3:
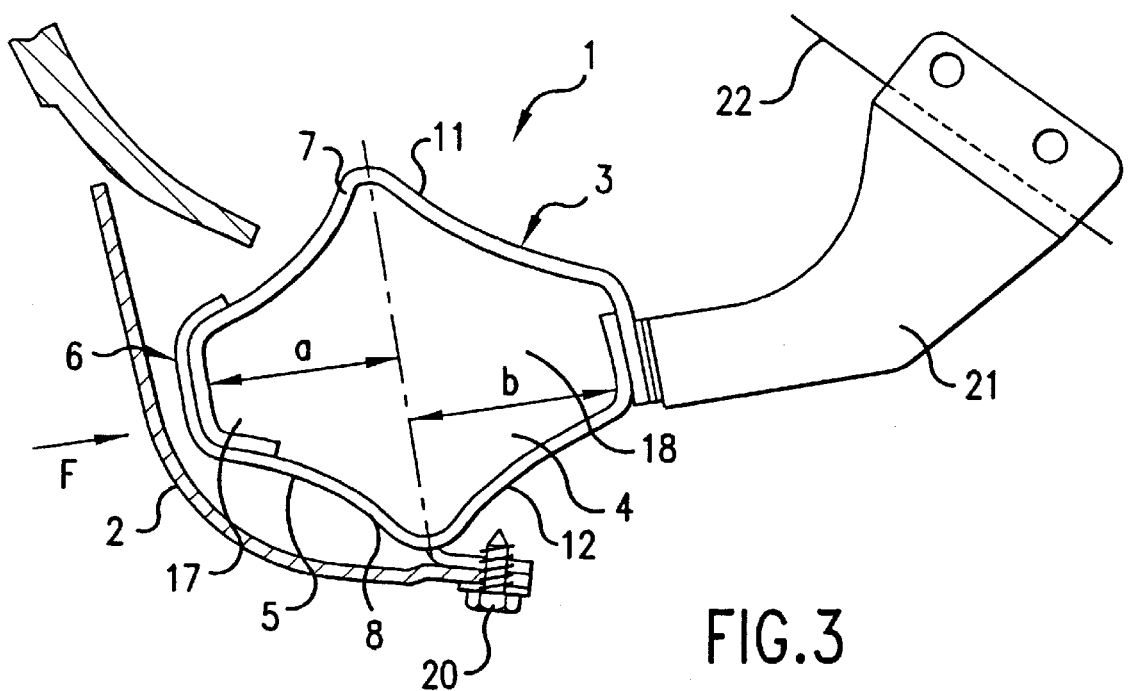
FIG. 3 is a view similar to FIG. 1 but showing a cross-sectional depth of a first honeycomb half located close to the impact as less than that of a second honeycomb half more remote from the impact, and with partial sections forming a closed loop having different material thicknesses.

In addition, the cross-sectional depth of a honeycomb half 17 close to the impact can be made less than that of honeycomb half 18 further away from the impact as seen in FIG. 3 where like numerals are used to designate like parts in FIG. 1, so that the honeycomb half 17 close to the impact, bent during the deformation of deformation body 3, is located completely in the honeycomb half 18 remote from the impact, and thus makes available a long displacement distance for the dashboard and/or the knee impact protector 2 because the remaining block length is small.

By a stamping or bending process, a retaining rib 19 is shaped from a partial section 12 of the deformation body 3, to which the rib knee impact protector 2 is secured by a screw connection 20.

In order additionally to increase energy absorption for extreme stresses, the deformation body is supported by a lever-type mount 21 on a dashboard 22. Mount 21 is likewise deliberately made capable of being deformed, but has a higher resistance to deformation than deformation body 3. Mount 21 is connected with deformation body 3 by screw connection 16, offset by bending from the middle of the wall, and is also mounted so that it can be removed from dashboard 22.

Figure 4:
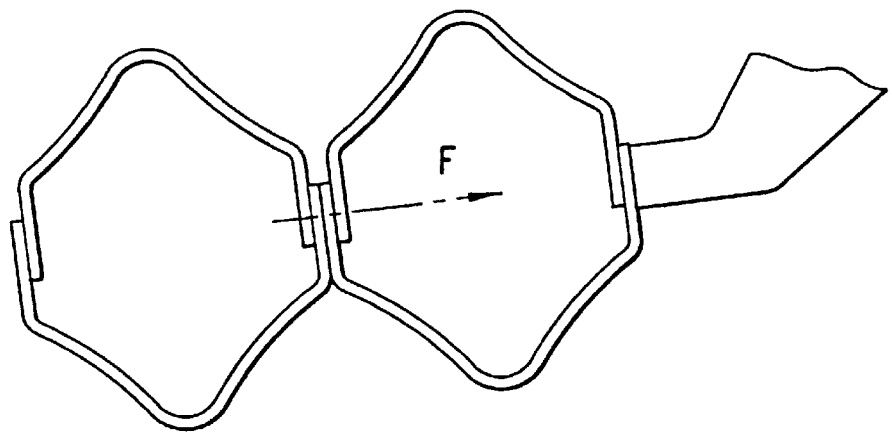
FIG. 4 is a side view of an embodiment in which a plurality of deformation bodies are fastened in a row to one another in the impact direction, with a reduced circumference of the bodies in relation to the deformation body of FIG. 1.

For another application, a plurality of deformation bodies 3 can be mounted in a row and abut one another in the impact direction (arrow F) as seen in FIG. 4 in order thereby, if necessary, to obtain even higher energy absorption, but this increases the block length that remains following complete deformation. The circumference of these sequential deformation bodies 3 can be reduced so that the deformation resistance is continuously increased. Increasing the width of the honeycomb deformation body 3 also results in higher deformation resistance.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Deformation element for use in a motor vehicle, comprising at least one deformation body having a honeycomb cross-section with a circumference defining a cavity which is open on sides thereof, a wall of said cross-section being formed into a closed loop comprised of two strap-shaped sections connected together to define the cross section and having ends which extend along the circumference and overlap each other in opposed connecting areas to form a double layer in each of the opposed connecting areas, wherein one of opposed connecting areas forms a wall section arranged to collapse and be subjected to impact upon being struck by a vehicle occupant.

2. Deformation element according to claim 1, wherein the strap-shaped sections have different material thicknesses.

3. Deformation element according to claim 1, wherein a cross-sectional depth of a first honeycomb half located close to the impact is less than that of a second honeycomb half more remote from the impact.

4. Deformation element according to claim 1, wherein the deformation body has rounded corners and sides which are indented toward a center of the deformation body.

5. Deformation element according to claim 1, wherein a retaining rib is cut out and bent outward from the wall of the deformation body.

6. Deformation element according to claim 1, wherein the deformation body is located in the impact direction behind a knee impact protector in an interior of the vehicle.

7. Deformation element according to claim 1, wherein the deformation body is supported on the vehicle by at least one lever-type mount.

8. Deformation element according to claim 7, wherein the force of the impact is initiated into the mount decentrally from the deformation body.

9. Deformation element according to claim 7, wherein the mount has a higher resistance to deformation than the deformation body.

10. Deformation element according to claim 1, wherein the at least one deformation body is a plurality of deformation bodies fastened to one another and arranged in a row in an impact direction.

11. Deformation element according to claim 10, wherein a circumference of deformation bodies located in the row in the impact direction is reduced in size in comparison with a circumference of a single deformation body.

12. Deformation element according to claim 1, wherein the overlap in opposite connecting areas is substantially along a direction of the impact.

* * * * *